MESSAGE SORTER

INVENTORS
W. C. BENGER
W. J. IVES

By Robert B. Harmon
ATTORNEY

MESSAGE SORTER

Filed Oct. 26, 1961 3 Sheets-Sheet 2

INVENTORS
W. C. BENGER
W. J. IVES
BY
ATTORNEY

INVENTORS
W. C. BENGER
W. J. IVES

BY

ATTORNEY

United States Patent Office 3,092,309

Patented June 4, 1963

3,092,309

MESSAGE SORTER

Walter C. Benger and Walter J. Ives, both of Ottawa, Ontario, Canada, assignors to Northern Electric Company, Limited, Montreal, Quebec, Canada, a corporation of Canada Filed Oct. 26, 1961, Ser. No. 147,884

4 Claims. (Cl. 234—3)

This invention relates to electronic data processing systems and more particularly to a system for checking the reliability of a tape message sorter.

In data communication systems, data from regional offices often are transmitted to a head office via teletype facilities, sorted into categories, converted from paper tape to magnetic tape and processed by a computer. The various categories of information received at the head office may include meter readings, payroll, stock, etc. It is necessary that the computer have only one category of information programmed into it for a given period, and it is for this purpose that a tape message sorter is used.

The tape message sorter to which this invention has been specifically applied will be briefly described.

Incoming tape is taken from one of the typing reperforators which terminate an incoming circuit from a regional office and is fed into a tape reader. The reader, operating at 600 words per minute, inserts the coded data intact into the sorter where the messages are identified and directed to one of several reperforators which punch out new tape at a rate of 600 words per minute. Each reperforator can be assigned to accept one or more categories of data.

Because the different categories of information are identified by a six character code, the message is directed through a form of delay for a six character duration, this delay being accomplished in an electronic circuit known as a shift register. During this delay period, the desired reperforator is recognized and selected. The sorted messages then can be transferred to magnetic tape which will be programmed into a computer.

With sorting being accomplished at a rate of 600 words per minute, the reliability of the tape message sorter is of utmost importance.

It is the primary object of this invention to describe a novel system for checking the reliability of a tape message sorter.

It is another object of this invention to describe a novel system for checking and improving the reliability of a tape message sorter where the reliability of the system while handling normal message information is not affected by momentary misbehaviour of electronic circuit components due to transients and other causes.

It is a further object of this invention to provide a secondary reliability checking system which verifies the operation of the switching code circuitry at all times, even during punching operations.

Still a further object of this invention is to describe a system for checking the reliability of a tape message sorter where a check on the reliability of the output reperforators themselves is not required.

These and other objects of this invention are attained in the preferred embodiment of the invention by providing three readings of the input tape to the sorter, the first reading being stepped through the shift register, switching code recognition and selecting circuits to choose the desired output reperforator, the second reading—delayed an amount of time sufficient to permit switching codes to be recognized and switching to take place—feeding the output mechanism, that is, the punch drive amplifiers and the reperforators, the third reading—delayed an amount of time sufficient to permit output tape to be punched and read in the reperforators is compared with the output tape from the reperforators in an electronic comparator circuit. Where the information does not agree, the sorter automatically stops and an alarm is initiated indicating that an error has been made.

The reading of the newly punched tape is accomplished in the same operating cycle that the reperforator punches the tape, by an apparatus such as described in W. J. Ives et al., copending U.S. application Serial No. 36,203, filed June 15, 1960, which will be described hereinafter in more detail.

Other objects and advantages of this invention will become apparent in the following detailed description when read in view of the accompanying drawings where like numbers refer to like parts and in which.

Figure 1:
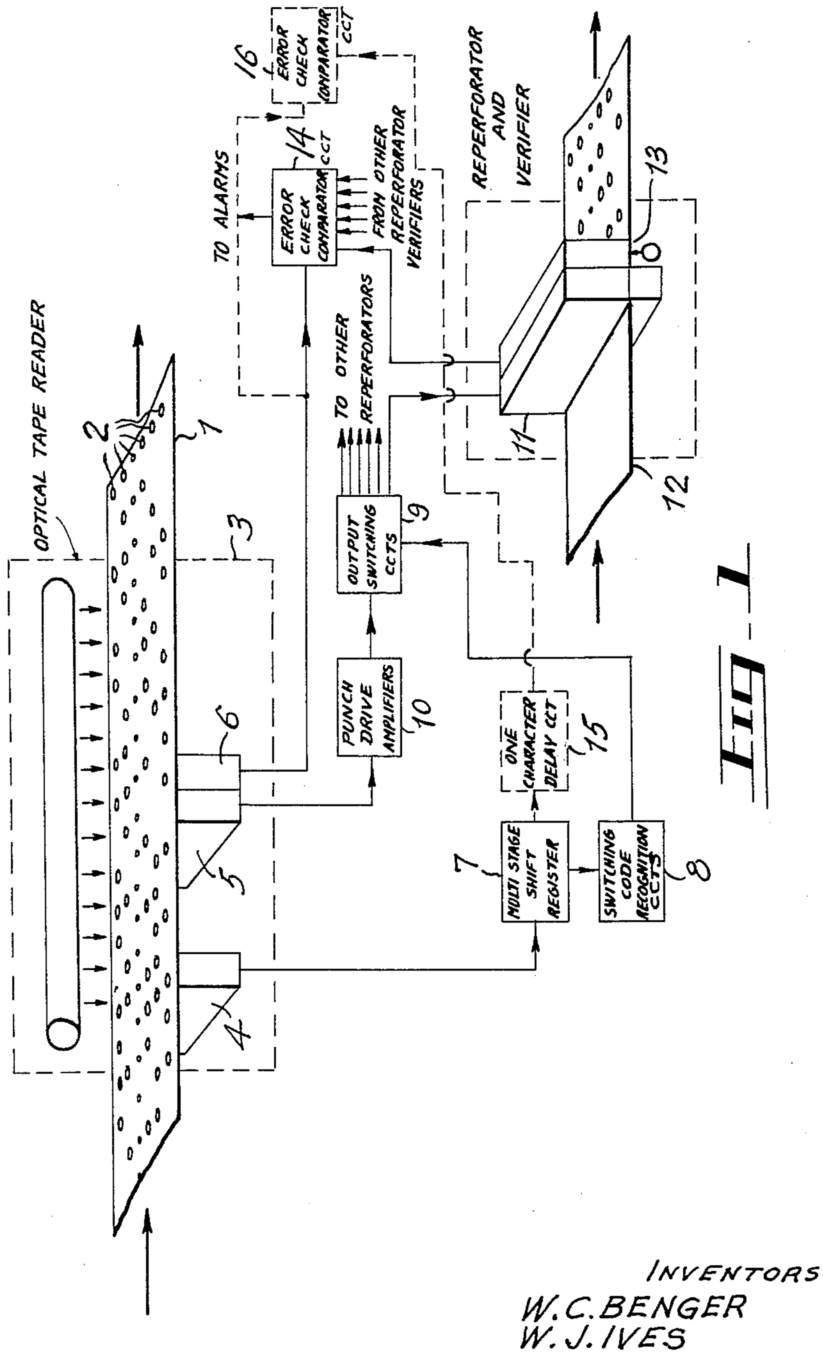
FIG. 1 is a simplified partially block schematic showing the preferred embodiment of this invetnion and a modification thereof.

Referring to the drawings, there is shown in FIG. 1 an input paper tape 1 containing codified information in the form of perforations 2 to be sorted into categories by the tape sorter. The input tape 1 is fed (from left to right) through photoelectric or optical tape reader 3 of a type well known to the art for reading codified data. Such readers are capable of starting and stopping under the control of start-stop pulses within a time interval of less than one character.

In this embodiment of the invention, the tape reader 3 is equipped with three tape reading positions 4, 5 and 6 so located such that readings at positions 4 and 5 are separated in time by six character codes and readings at positions 5 and 6 are separated in time by one character code.

The information having been read in head 4 is applied to a multi stage shift register 7, where it is stored until the six character identification code has been read, at which time switching code recognition circuits 8 identify the code and activate output switching circuits 9 which choose the proper reperforator to be operated.

By this time the first character code on the input tape 1 has reached reading position 5 where it is read and applied to the punch drive amplifiers 10 which energize the reperforator already selected by the switching circuits 9. The selected reperforator punches the sorted information on a new paper tape 12. Immediately following the punching operation in reperforator 11, the tape is stepped and read in verifier 13.

By this time the first character code on the input tape 1 has reached reading position 6 where it is read, and simultaneously with the reading in verifier 13, is applied to a comparator circuit 14 of a type well known to the art for comparing electrical data from two different sources. Where the information does not agree the sorter automatically stops and an alarm is initiated indicating an error has been made. Details of reperforator 11 atnd verifier 13 are described hereinafter with reference to FIGS. 3 and 4.

As can be readily understood from the above description of FIG. 1, the reliability of the whole sorting system is not affected by the shift register 7 or the switching code recognition circuits 8. Any momentary misbehaviour in these circuits will be significant only during the time when switching code information is being passed, and as this is only a small fraction of the average message duration, the probability of error due to this circuitry is very small and under worst conditions could only lead to a switching error for which other means of protection usually is provided.

Where it is desired to check the reliability of the shift register 7 and switching code recognition circuits 8 a one character delay circuit 15 and an additional error checking comparator circuit 16 shown in dotted outline can be added. The information after being read in reading head 6 is applied to comparator circuit 16 simultaneously with information stored in shift register 7, which has been delayed for six character codes and further delayed one character code in delay circuit 15. This modified system will permit the detection of degradation in the switching code circuits performance before any actual system errors occur.

Figure 2:
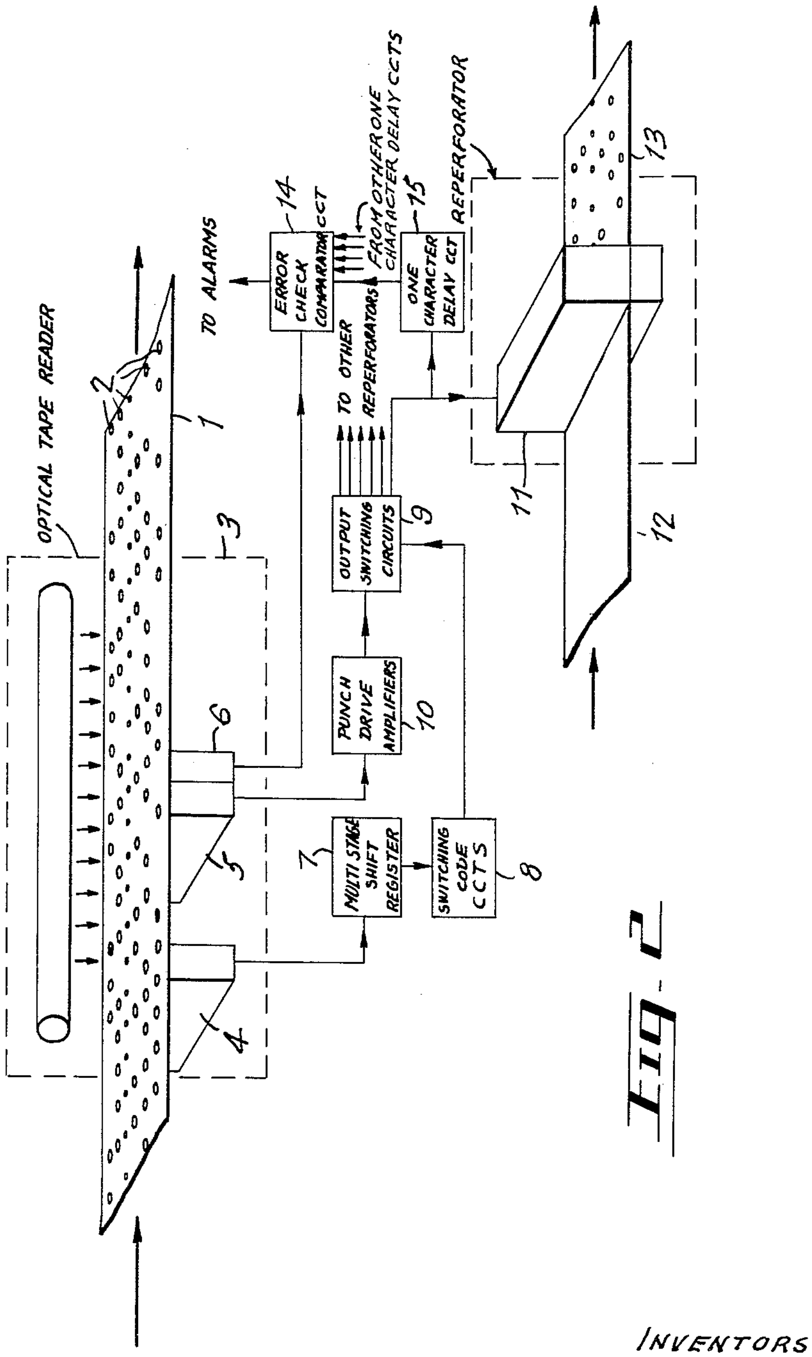
FIG. 2 shows a further embodiment of this invention where a reliability check on the output reperforators is not considered necessary.

FIG. 2 shows a similar arrangement to FIG. 1 except that it is modified to provide for a reliability check of the system when the checking of the operation of the reperforators themselves is not considered necessary. In this arrangement the information taken from head 5 is compared with the information taken from head 6 in comparator circuit 14 after being suitably delayed one character in delay circuit 15. No reperforator verifier is provided in this instance.

Figure 3:
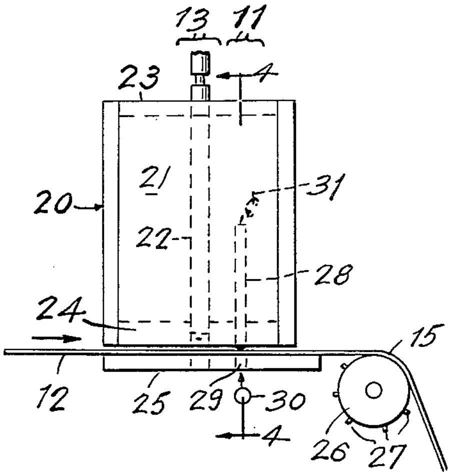
FIG. 3 shows a side elevation view of the details of apparatus in FIG. 1 labelled reperforator and verifier.
Figure 4:
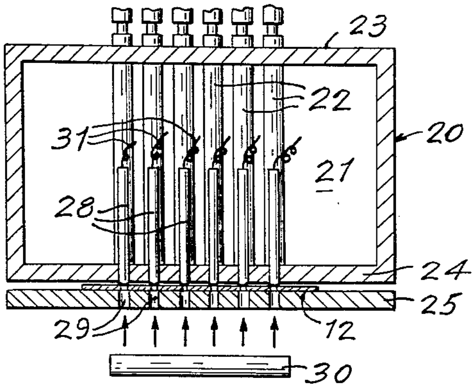
FIG. 4 is a sectional view taken along 3—3 of FIG. 3.

Details of reperforator 11 and verifier 13 shown enclosed in dotted lines in FIG. 1 will now be briefly described with reference to FIGS. 3 and 4. There is shown a punch block assembly 20 having a cavity 21 therein and a set of punches 22 movable through openings in upper and lower guide plates 23 and 24 and cooperating with a die plate 25, the plates 24 and 25 being spaced apart to form a tape guide for output tape 12.

The punches 22 are selectively operated by linkages 9 (not shown) under control of the punch drive amplifier 10, of FIG. 1. A tape feed wheel 26 having projecting teeth 27 is shown (FIG. 3) for advancing the tape forward.

Also shown located within the punch block assembly 20 is a set of photoelectric diodes 28 rigidly mounted by any suitable means such as in cast silicon rubber, with the light sensitive surfaces of the diodes protruding through openings in the guide plate 24 to appear above the tape guide for tape 12 and cooperating with openings 29 in the guide plate 25; and a source of light 30 located beneath the openings 29. The openings 29 are sealed with any light conducting material such as the material sold under the tradename Lucite to prevent dust from collecting in these openings immediately under the diodes 28. Individual leads 31 are connected from each of diodes 28 for connection to the comparator circuit 14 of FIG. 1.

As signals from the punch drive amplifiers 10 of FIG. 1 are applied to the reperforator, punches 22 operate and perforate tape 12 in response to these signals. When each sequence of signals is completed, representing a character code, the reperforator is deenergized and the punches are withdrawn from tape 12 while the tape feed wheel 26 advances the tape 12 one step, the perforations in the tape thereby appearing at the verifier 13 where they are read and transmitted to comparator circuit 14 of FIG. 1. The process of punching, stepping and reading continues in each reperforator as long as the reperforator is being energized by the punch drive amplifiers 10 of FIG. 1.

The reperforator to which the verifier has been added is of the high speed type such as described in Canadian Patent No. 495,457 to W. J. Zenner, August 18, 1953.

Although this invention is described with particular reference to paper tape at the input and output of the sorter and to reading devices of the optical type, it should be understood that the principles of this invention apply equally well to systems using magnetic tape with magnetic readers and to systems using mechanical reading devices.

What is claimed is:

1. In a tape message sorter, a system for checking the reliability thereof, comprising in combination: an input tape to be sorted as to category of data recorded therein, a constant speed tape reading device for reading data from said input tape and having three reading positions therein, a plurality of reperforators for preparing individual output tapes sorted as to category, a plurality of sensing devices located adjacent to the output of said reperforators for reading said output tapes one character after the reperforation thereof, first means for the storage and code recognition of data read from the first of said three positions and for the selection of individual output reperforators, second means for energizing the reperforators in response to data read from the second of said three positions, comparing means to compare data read from the third of said three positions with data read from said sensing devices, said three reading positions being operable in timed relation such that the first and second of said three positions operate a sufficent number of characters apart to permit code recognition and reperforator selection to coincide with the energizing of the reperforators, and the third of said three positions operates one character after the second of said three positions.

2. The apparatus of claim 1 in which an additional comparing means is provided to compare data read from the third of said three positions with data from the output of said first means delayed one additional character.

3. In a tape message sorter, a system for checking the reliability thereof comprising in combination: an input tape to be sorted as to category of data recorded therein, a constant speed tape reading device for reading data from said input tape and having three reading positions therein, a plurality of reperforators for preparing individual output tapes sorted as to category, first means for the storage and code recognition of data read from the first of said three positions and for the selection of individual output reperforators, second means for energizing the reperforators in response to data read from the second of said three positions, a plurality of one character delay means responsive to the energizing data at the input to the reperforators, comparing means to compare data read from the third of said three positions with data from the output of said delay means, said three reading positions being operable in timed relation such that the first and second of said three positions operate a sufficient number of characters apart to permit code recognition and reperforator selection to coincide with the energizing of the reperforators, and the third of said three positions operates one character after the second of said three positions.

4. A method for checking the reliability of a tape message sorter of the character described, consisting of taking three readings of the data recorded on an input tape to be sorted as to category, taking one reading for each of the plurality of output tapes sorted as to category, determining character codes and selecting perforators for preparing output tapes in response to the first of said three readings of the input tape, energizing the selected reperforators in response to the second of said three readings of the input tape, the first and second of said three readings being taken in timed relation such that the reperforators are selected and energized at the same time, comparing the data taken from the third of said three readings of the input tape with the individual readings taken from the output tapes, said last two readings being so timed as to occur together.

References Cited in the file of this patent

UNITED STATES PATENTS

| | | |
|---|---|---|
| 2,053,067 | Cunningham | Sept. 1, 1936 |
| 2,590,625 | Jole | Mar. 25, 1952 |